United States Patent
Corvaisier et al.

(10) Patent No.: US 9,796,935 B2
(45) Date of Patent: Oct. 24, 2017

(54) METHOD FOR SELECTIVE HYDROGENATION USING A CATALYST CONTAINING IRON AND AT LEAST ONE METAL SELECTED FROM BETWEEN ZINC OR COPPER

(71) Applicant: IFP Energies nouvelles, Rueil-Malmaison (FR)

(72) Inventors: Fabien Corvaisier, Richwiller (FR); Antoine Fecant, Brignais (FR); Cecile Thomazeau, Lyons (FR); Pascal Raybaud, Lyons (FR); Yves Schuurman, Curis au Mont d'or (FR); David Farrusseng, Belmont d'Azegues (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 15/029,966

(22) PCT Filed: Sep. 19, 2014

(86) PCT No.: PCT/EP2014/070049
§ 371 (c)(1),
(2) Date: Apr. 15, 2016

(87) PCT Pub. No.: WO2015/055379
PCT Pub. Date: Apr. 23, 2015

(65) Prior Publication Data
US 2016/0264881 A1  Sep. 15, 2016

(30) Foreign Application Priority Data
Oct. 16, 2013 (FR) .................................. 13 60042

(51) Int. Cl.
| C10G 45/34 | (2006.01) |
| B01J 21/04 | (2006.01) |
| B01J 23/80 | (2006.01) |
| B01J 23/745 | (2006.01) |
| B01J 35/00 | (2006.01) |
| C10G 45/32 | (2006.01) |

(52) U.S. Cl.
CPC .............. *C10G 45/34* (2013.01); *B01J 21/04* (2013.01); *B01J 23/745* (2013.01); *B01J 23/80* (2013.01); *B01J 35/0006* (2013.01)

(58) Field of Classification Search
CPC .......... C10G 45/32; C10G 45/34; B01J 35/00; B01J 35/0006
See application file for complete search history.

(56) References Cited

U.S. PATENT DOCUMENTS

| 6,042,798 A | 3/2000 | Masuda et al. | |
| 2006/0217579 A1* | 9/2006 | Bailey | B01J 23/63 585/259 |
| 2009/0318738 A1* | 12/2009 | Fecant | B01J 21/04 585/269 |

OTHER PUBLICATIONS

Chorkendorff, I. et al. (2007). Concepts of Modern Catalysis and Kinetics, 2$^{nd}$ ed., Wiley-VCH, 457 pgs [Office action references p. 196].*
International Search Report for PCT/EP2014/070049 dated Dec. 8, 2014.
Bridier, B. et al., "Cooperative Effects in Ternary Cu—Ni—Fe Catalyst Lead to Enhanced Alkene Selectivity in Alkyne Hydrogenation," J. Am. Chem. Soc., 2010, vol. 132, pp. 4321-4327.
Nitta, Y. et al., "Partial Hydrogenation of Phenylacetylene on Copper-Promoted Iron Catalyst," Catalysis Letters, 1990, vol. 5, pp. 67-72.

* cited by examiner

*Primary Examiner* — Brian McCaig
(74) *Attorney, Agent, or Firm* — Millen White Zelano & Branigan, P.C.

(57) ABSTRACT

The invention concerns a method for selectively hydrogenating a hydrocarbon charge containing at least two carbon atoms per molecule, having a final boiling point which is less than or equal to 250° C., and comprising at least one polyunsaturated compound, wherein the charge, in the presence of hydrogen, is brought into contact with at least one catalyst comprising a carrier and an active metal phase deposited on the carrier, the active metal phase comprising iron and at least one metal selected from zinc and copper in a molar ratio of Fe:(Zn and/or Cu) of between 0.35 and 0.99.

11 Claims, No Drawings

METHOD FOR SELECTIVE HYDROGENATION USING A CATALYST CONTAINING IRON AND AT LEAST ONE METAL SELECTED FROM BETWEEN ZINC OR COPPER

The selective hydrogenation method makes it possible to transform the polyunsaturated compounds of petroleum fractions by conversion of the most unsaturated compounds into the corresponding aromatic compounds or alkenes by preventing the total saturation and therefore the formation of corresponding naphthenes or alkanes.

The object of the invention is to propose a method for hydrogenation of unsaturated hydrocarbon compounds that are present in the hydrocarbon fractions, preferably fractions that are obtained from steam-cracking or catalytic cracking.

Below, the groups of chemical elements are provided according to the CAS classification (CRC Handbook of Chemistry and Physics, CRC Press Editor, Chief Editor D. R. Lide, 81$^{st}$ Edition, 2000-2001). For example, group VIII according to the CAS classification corresponds to the metals of columns 8, 9 and 10 according to the new IUPAC classification.

PRIOR ART

The monounsaturated organic compounds such as, for example, ethylene, propylene, are at the source of the production of polymers, plastic materials, and other value-added chemical products. These compounds are obtained from natural gas, naphtha, or diesel fuel that has been treated by methods of steam-cracking or catalytic cracking. These methods are performed at high temperature and produce, in addition to the desired monounsaturated compounds, poly-unsaturated organic compounds such as acetylene, propadiene, and methyl acetylene (or propyne), 1,2-butadiene and 1,3-butadiene, vinyl acetylene and ethyl acetylene, and other polyunsaturated compounds whose boiling point corresponds to the C5+ gasoline fraction (gasolines containing hydrocarbon compounds having 5 carbon atoms or more), in particular styrene or indene compounds. These polyunsaturated compounds are very reactive and lead to parasitic reactions in the polymerization units. It is therefore necessary to eliminate them before upgrading these fractions.

Selective hydrogenation is the main treatment developed for specifically eliminating the undesirable polyunsaturated compounds from these hydrocarbon feedstocks. It makes possible the conversion of the polyunsaturated compounds into the corresponding aromatic compounds or alkenes by preventing their total saturation and therefore the formation of corresponding naphthenes or alkanes.

In general, the selective hydrogenation methods use catalysts based on metals from group VIII of the periodic table, preferably palladium or nickel. The active phase of the catalysts comes in the form of metal nanoparticles deposited on a substrate that can be a refractory oxide in the form of balls, extrudates, trilobes or in the forms that have other geometries. The metal content as well as the optional presence of a second metal element are part of the criteria that are important in the activity and the selectivity of catalysts.

The promotion of palladium-based catalysts has frequently been proposed so as to improve the selective hydrogenation performance. These promoters can be, for example, silver (U.S. Pat. Nos. 2,802,889 and 5,648,576), gallium (EP 1,834,939), or silver and iron (U.S. Pat. No. 3,243,387). With palladium always being present, the cost of these formulations remains high.

It is also often proposed to substitute palladium by nickel, a metal that is less active than the palladium that it is therefore necessary to use in large quantities in the catalyst. In addition, the selectivity of the nickel is much less than that of palladium, and this is the reason for the use of promoters for improving its performance. For example, it is known from the U.S. Pat. No. 5,208,405 to use a catalyst based on nickel and silver for the selective hydrogenation of $C_4$-$C_{10}$ diolefins. In contrast, it is known to promote nickel, present as a majority element, with metals of group IB (FR 2,949,077) or tin (FR 2,949,078). The high contents of metals nevertheless create problems in terms of cost or the preparation of catalysts.

It is also known from open literature (Y. Nitta et al., Studies in Surface Science and Catalysis, Vol. 75, Part C (1993), p. 2333; Y. Nitta et al., Catalysis Letters, 5 (1990), p. 67) to use catalysts based on non-noble metals such as copper and iron. However, the total metal phase contents are very high (approximately 50%), this having a strong impact on the cost of the catalysts. In addition, the authors explain that the presence of alkalines such as potassium or sodium in large quantities is essential to achieving high performance. Three-metal formulations Cu—Ni—Fe in the form of catalysts by mass for selective alkyne hydrogenation reaction are also proposed (B. Bridier et al., Journal of the American Chemical Society, 132 (2010), p. 4321).

This invention relates to a method for selective hydrogenation using a catalyst whose active metal phase contains metals that have little or nothing in common in terms of selective hydrogenation.

More particularly, this invention relates to a method for selective hydrogenation of a hydrocarbon feedstock that contains at least 2 carbon atoms per molecule and that has a final boiling point that is less than or equal to 250° C. and that comprises at least one polyunsaturated compound, in which in the presence of hydrogen, said feedstock is brought into contact with at least one catalyst that comprises a substrate and an active metal phase deposited on said substrate; said active metal phase comprises iron and at least one metal that is selected from between zinc and copper in a molar ratio of Fe:(Zn and/or Cu) of between 0.35 and 0.99.

The advantage of this invention resides in the use of a catalyst combining inexpensive metals in the active phase while making it possible to achieve a high performance level in activity and selectivity in a selective hydrogenation method when a specific molar ratio of the metals is observed in the active phase. In addition, this performance level is in general reached by using a limited active phase content deposited on the substrate.

According to a variant, the molar ratio Fe:(Zn and/or Cu) is between 0.4 and 0.8.

According to a variant, the content by mass of the active metal phase in relation to the total mass of the final substrate catalyst is between 0.05% and 40%, preferably between 0.1% and 25%, and in a more preferred manner between 0.15% and 15%.

According to a variant, the substrate comprises at least one refractory oxide that is selected from the group that consists of the oxides of magnesium, aluminum, silicon, zirconium, thorium, or titanium, by itself or in a mixture with one another. Preferably, the substrate is selected from among aluminas, silicas, and silica-aluminas. According to a variant, the substrate is in the form of balls or extrudates.

According to a variant, the active metal phase comprises at least one additional metal that is selected from among the metals of group VIII other than iron, and the metals of group IB other than copper.

According to a variant, the hydrocarbon feedstock is selected from the group that consists of a fraction that is obtained from catalytic cracking, a C2 steam-cracking fraction, a C3 steam-cracking fraction, a C4 steam-cracking fraction, a C5 steam-cracking fraction, and a steam-cracking gasoline.

According to a variant, the selective hydrogenation method is implemented in the gaseous phase or in the liquid phase.

According to a variant, the selective hydrogenation method is implemented at a temperature of between 0° C. and 500° C., a pressure of between 0.1 and 20 MPa, an hourly volumetric flow rate of between 0.1 and 200 $h^{-1}$ for a liquid feedstock, between 100 and 50,000 $h^{-1}$ for a gaseous feedstock, and at a molar ratio of (hydrogen)/(polyunsaturated compounds to be hydrogenated) of between 0.1 and 200.

According to a preferred variant, the hydrocarbon feedstock is a steam-cracking gasoline. According to this variant, the selective hydrogenation method is implemented in the liquid phase at a total pressure of between 0.3 and 6.5 MPa, at a temperature of between 20 and 250° C., at a molar ratio of (hydrogen)/(polyunsaturated compounds to be hydrogenated) of between 1 and 2, and at an hourly volumetric flow rate of between 0.5 $h^{-1}$ and 50 $h^{-1}$.

DETAILED DESCRIPTION OF THE INVENTION

This invention relates to a selective hydrogenation method using a substrate catalyst whose active metal phase contains iron and at least one metal that is selected from between zinc and copper and in which the molar ratio Fe:(Zn and/or Cu) is between 0.35 and 0.99.

The hydrocarbon feedstock that is treated in the selective hydrogenation method contains at least 2 carbon atoms per molecule and has a final boiling point that is less than or equal to 250° C. and comprises at least one polyunsaturated compound. More particularly, it is selected from the group that consists of a fraction that is obtained from catalytic cracking, a C2 steam-cracking fraction, a C3 steam-cracking fraction, a C4 steam-cracking fraction, a C5 steam-cracking fraction, and a steam-cracking gasoline.

Said hydrocarbon feedstock comprises at least one polyunsaturated compound. More specifically, said polyunsaturated hydrocarbons that are present in said treated feedstock are in particular compounds that comprise at least one acetylene group (i.e., at least one triple bond) and/or at least one diene group (i.e., at least two double bonds). In particular, said polyunsaturated hydrocarbon feedstock can comprise at least one type of compound that contains both one acetylene group and one diene group per molecule. The pyrolysis gasoline feedstock can in addition comprise alkenyl-aromatic compounds.

The fraction that is obtained from catalytic cracking, advantageously used for implementing the selective hydrogenation method according to the invention, corresponds to a hydrocarbon fraction whose boiling point is in general between 0° C. and 250° C., preferably between 10° C. and 220° C. In general, it contains 15 to 80% olefins (olefins and cycloolefins) and a diolefin content that is less than 5% and in general at most 4%; the remainder primarily consists of paraffins, naphthenes, and aromatic compounds.

The C2 steam-cracking fraction, advantageously used for implementing the selective hydrogenation method according to the invention, in general comprises ethylene, acetylene, and ethane. The C2 fraction has, for example, the following composition: 90% by weight of ethylene, on the order of 0.3 to 2% by weight of acetylene, with the remainder essentially being ethane. In certain C2 steam-cracking fractions, between 0.1 and 1% by weight of C3 compounds can also be present.

The C3 steam-cracking fraction, advantageously used for implementing the selective hydrogenation method according to the invention, in general comprises propylene, propadiene, methyl acetylene, and propane. The C3 fraction has, for example, the following mean composition: on the order of 90% by weight of propylene, on the order of 3 to 8% by weight of propadiene, and methyl acetylene, with the remainder essentially being propane. In certain C3 fractions, between 0.1 and 2% by weight of C2 compounds and C4 compounds can also be present.

The C4 steam-cracking fraction, advantageously used for implementing the selective hydrogenation method according to the invention, in general comprises butane, butene, butadiene, vinyl acetylene, and butyne. The C4 fraction has, for example, the following mean composition by mass: 1% by weight of butane, 46.5% by weight of butene, 51% by weight of butadiene, 1.3% by weight of vinyl acetylene (VAC), and 0.2% by weight of butyne. In certain C4 fractions, between 0.1 and 2% by weight of C3 compounds and C5 compounds can also be present.

The C5 steam-cracking fraction, advantageously used for implementing the selective hydrogenation method according to the invention, in general comprises pentanes, pentenes, and pentadienes. The C5 fraction has, for example, the following composition: 21% by weight of pentanes, 45% by weight of pentenes, 34% by weight of pentadienes.

The steam-cracking gasoline or pyrolysis gasoline, advantageously used for implementing the selective hydrogenation method according to the invention, corresponds to a hydrocarbon fraction whose boiling point is in general between 0° C. and 250° C., preferably between 10° C. and 220° C. The polyunsaturated hydrocarbons that are present in said steam-cracking gasoline are in particular diolefin compounds (butadiene, isoprene, cyclopentadiene, . . . ), styrene compounds (styrene, alpha-methylstyrene, . . . ), and indene compounds (indene . . . ). The steam-cracking gasoline in general comprises the C5-C12 fraction with traces of C3, C4, C13, C14, C15 (for example, between 0.1 and 3% by weight for each of these fractions). For example, a feedstock that is formed by pyrolysis gasoline in general has the following composition of % by weight: 8 to 12% by weight of paraffins, 58 to 62% by weight of aromatic compounds, 8 to 10% by weight of monoolefins, 18 to 22% by weight of diolefins, and 20 to 300 ppm by weight of sulfur (part per million), with all of the compounds forming 100%.

In a preferred manner, the hydrocarbon feedstock that contains polyunsaturated compounds in accordance with the selective hydrogenation method according to the invention is a steam-cracking gasoline.

The object of the selective hydrogenation method according to the invention is to eliminate said polyunsaturated hydrocarbons that are present in said feedstock to be hydrogenated by initiating the conversion of said polyunsaturated hydrocarbons into the corresponding alkenes or aromatic compounds by preventing the total saturation of said hydrocarbons in such a way as to prevent the formation of the corresponding naphthenes or alkanes.

For example, when said feedstock is a C2 fraction, the object of the selective hydrogenation method according to the invention is to hydrogenate acetylene selectively. When said feedstock is a C3 fraction, the object of the selective hydrogenation method according to the invention is to hydrogenate propadiene and methyl acetylene selectively. In the case of a C4 fraction, the object is to eliminate butadiene, vinyl acetylene (VAC) and butyne; in the case of a C5 fraction, the object is to eliminate pentadienes. When said feedstock is a steam-cracking gasoline, the object of the selective hydrogenation method according to the invention is to hydrogenate selectively said polyunsaturated hydrocarbons that are present in said feedstock that is to be treated in such a way that the diolefin compounds are partially hydrogenated into monoolefins and the styrene and indene compounds are partially hydrogenated into corresponding aromatic compounds.

The technological implementation of the selective hydrogenation method according to the invention is carried out, for example, by injection, in upward flow or in downward flow, of the feedstock of polyunsaturated hydrocarbons and hydrogen into at least one fixed-bed reactor. Said reactor can be of the isothermal type or the adiabatic type. An adiabatic reactor is preferred. The polyunsaturated hydrocarbon feedstock can advantageously be diluted by one or more re-injection(s) of the effluent, obtained from said reactor where the selective hydrogenation reaction takes place, at various points in the reactor, located between the inlet and the outlet of the reactor. The technological implementation of the selective hydrogenation method according to the invention can also advantageously be carried out in a reactive distillation column or in reactor-exchangers. The hydrogen stream can be introduced at the same time as the feedstock to be hydrogenated and/or at one or more different points in the reactor.

The selective hydrogenation of the C2, C3, C4, C5 and C5+ fractions can be carried out in the gaseous phase or in the liquid phase, preferably in the liquid phase. Actually, a reaction in the liquid phase makes it possible to lower the energy cost and to increase the service life of the catalyst.

In a general manner, the selective hydrogenation is carried out at a temperature of between 0° C. and 500° C., a pressure of between 0.1 and 20 MPa, an hourly volumetric flow rate V.V.H. (defined as the ratio of the volumetric flow rate of feedstock to the volume of the catalyst per hour) of between 0.1 and 200 $h^{-1}$ for a liquid feedstock, between 100 and 50,000 $h^{-1}$ for a gaseous feedstock, and a molar ratio of hydrogen/(polyunsaturated compounds to be hydrogenated) of between 0.1 and 200. More particularly, in the case of a hydrogenation reaction in the liquid phase, the pressure is in general between 1 and 6.5 MPa, more preferably between 1 and 5 MPa; the temperature is between 2 and 200° C.; and the molar ratio of hydrogen/(polyunsaturated compounds to be hydrogenated) is between 0.1 and 10, preferably between 1 and 8. The hourly volumetric flow rates are between 1 and 200 $h^{-1}$.

In the case of a hydrogenation reaction in the gaseous phase, the pressure is in general between 1 and 3 MPa, the temperature is between 40 and 120° C., and the molar ratio of hydrogen/(polyunsaturated compounds to be hydrogenated) is between 0.1 and 200. The hourly volumetric flow rates are between 100 and 50,000 $h^{-1}$.

In a preferred manner, a selective hydrogenation method is carried out in which the feedstock is a steam-cracking gasoline that comprises polyunsaturated compounds; the molar ratio of (hydrogen)/(polyunsaturated compounds to be hydrogenated) is in general between 1 and 2; the temperature is in general between 20 and 250° C., preferably between 50 and 180° C.; the hourly volumetric flow rate (V.V.H.) is in general between 0.5 $h^{-1}$ and 50 $h^{-1}$, preferably between 1 $h^{-1}$ and 20 $h^{-1}$; and the pressure is in general between 0.3 MPa and 6.5 MPa, preferably between 2.0 MPa and 3.5 MPa. The hydrogen flow rate is adjusted so as to use a sufficient quantity of it to hydrogenate theoretically all of the polyunsaturated compounds and to hold up excess hydrogen at the reactor outlet. So as to limit the temperature gradient in the reactor, it may be advantageous to recycle a fraction of the effluent to the inlet and/or to the middle of the reactor.

The catalyst that is used for implementing the selective hydrogenation method according to the invention comprises a substrate and an active metal phase deposited on said substrate; said active metal phase comprises iron and at least one metal that is selected from between zinc and copper in a molar ratio of Fe:(Zn and/or Cu) of between 0.35 and 0.99.

Preferably, the molar ratio of Fe:(Zn and/or Cu) of the active metal phase is between 0.4 and 0.8.

The content by mass of the active metal phase in relation to the total mass of the final substrate catalyst is in general between 0.05% and 40%, in a preferred manner between 0.1% and 25%, and in a very preferred manner between 0.1% and 15%.

According to a variant, the active metal phase preferably comprises iron and zinc in a molar ratio of Fe:Zn of between 0.35 and 0.99, preferably between 0.4 and 0.8. In a particularly preferred manner, the active metal phase consists of iron and zinc in a molar ratio of Fe:Zn of between 0.35 and 0.99, preferably between 0.4 and 0.8.

According to another variant, the active metal phase preferably comprises iron and copper in a molar ratio of Fe:Cu of between 0.35 and 0.99, preferably between 0.4 and 0.8. In a particularly preferred manner, the active metal phase consists of iron and copper in a molar ratio of Fe:Cu of between 0.35 and 0.99, preferably between 0.4 and 0.8.

The active metal phase of said catalyst can comprise at least one additional metal that is selected from among the metals of group VIII other than iron, and the metals of group IB other than copper. In a preferred manner, the additional metal of group VIII is selected from among palladium, platinum, ruthenium, rhodium, and iridium. In a preferred manner, the additional metal of group IB is selected from among gold and silver. Said additional metal(s) is (are) preferably present with a content that represents from 0.01 to 20% by weight of the mass of the catalyst, preferably 0.1 to 10% by weight of the mass of the catalyst, and in an even more preferred manner of 0.1 to 5% by weight of the mass of said catalyst. When an additional metal is present, its molar ratio with iron is always strictly less than 1.

The substrate can comprise at least one refractory oxide that is selected from the group that consists of oxides of magnesium, aluminum, silicon, zirconium, thorium, or titanium, by itself or in a mixture with one another, such as silica-alumina. Preferably, the substrate is an aluminum oxide (alumina) or silicon (silica) or silica-alumina. The substrate can also be a carbon, a silico-aluminate, a clay, or any other compound that is known for being used as a substrate. Preferably, the substrate has a BET surface area of between 5 and 350 $m^2/g$, in an even more advantageous way between 50 and 200 $m^2/g$. The specific BET surface area is measured by physisorption with nitrogen (measured by the Brunauer, Emmett, Teller method, i.e., the BET method as defined in S. Brunauer, P. H. Emmett, E. Teller, J. Am. Chem. Soc., 1938, 60 (2), pp. 309-319). The total pore volume of the substrate is in general between 0.1 and 3 cm³/g, in a preferred manner between 0.4 and 1.5 cm³/g. The total pore volume is measured by mercury porosimetry according to the standard ASTM D4284-92 with a wetting angle of 140°, for example by means of an Autopore III™ model device of the trademark Microméritics™.

The substrate can be shaped in the form of balls, extrudates, trilobes, pellets, irregular and non-spherical agglomerates whose specific shape can result from a crushing or monolith stage. In an advantageous manner, said substrate comes in the form of balls or extrudates.

The substrate can optionally contain impurities with a maximum height of several hundreds of ppm such as sodium, potassium, magnesium, chlorine, sulfates.

The preparation of the catalyst can be carried out by any method that is known to one skilled in the art. In general, it comprises the consecutive or simultaneous impregnation of the metals on the substrate, a drying, a calcination, and then a reduction. Optionally, a drying stage and/or a calcination stage can be carried out between the consecutive impregnation stages.

The impregnation of metals on the substrate can be carried out by any method that is well known to one skilled in the art. The impregnation of the substrate consists of, for example, bringing said substrate into contact with at least one solution, aqueous or organic (such as an alcohol), containing at least one precursor of iron and/or of a metal that is selected from between zinc and/or copper in the dissolved state, or else bringing said substrate into contact with at least one colloidal solution of at least one precursor of iron and/or of metal that is selected from between zinc and/or copper, in oxidized form (oxide, oxy(hydroxide) or hydroxide nanoparticles of the metal(s)) or in reduced form (metal nanoparticles where the metal(s) is (are) in the reduced state). In particular, said impregnation can be carried out by dry impregnation, by excess impregnation, or else by deposition-precipitation (as described in the U.S. Pat. Nos. 5,874,381 and 6,534,436) according to methods that are well known to one skilled in the art. In a preferred manner, said impregnation is carried out by dry impregnation, which consists in bringing the substrate of the catalyst into contact with a solution that contains at least one precursor of iron and/or of metal selected from between zinc and/or copper, whose volume is equal to the pore volume of the substrate to be impregnated. This solution contains the metal precursor(s) at the desired concentration, in dissolved form, and/or in the form of colloidal nanoparticles in suspension. In the case of bringing said substrate into contact with at least one solution, aqueous or organic, containing at least one precursor of iron and/or of metal selected from between zinc and/or copper, in the dissolved state, said metal(s) is (are) brought into contact with said substrate by means of any metal precursor that is soluble in the aqueous phase or in the organic phase. In a preferred manner, said precursor of iron and/or of metal that is selected from between zinc and/or copper is introduced into an aqueous solution, which is brought into contact with said substrate.

Any compound that contains the element iron can be used as an iron precursor. In a preferred manner, the precursor is iron nitrate, iron citrate, iron acetate, iron acetylacetonate, iron bromide, iron chloride, iron fluoride, iron iodide, iron sulfate. In a very preferred manner, the iron precursor is iron nitrate.

When the second metal is zinc, any compound that contains the element zinc can be used. In a preferred manner, the precursor is zinc nitrate, zinc citrate, zinc acetate, zinc acetylacetonate, zinc bromide, zinc chloride, zinc fluoride, zinc iodide, zinc sulfate, zinc carbonate. In a very preferred manner, the zinc precursor is zinc nitrate.

When the second metal is copper, any compound that contains the element copper can be used. In a preferred manner, the precursor is copper acetate, copper acetylacetonate, copper nitrate, copper sulfate, copper chloride, copper bromide, copper iodide, copper fluoride. In a very preferred manner, the copper precursor is copper nitrate.

After the impregnation, the impregnated catalyst is in general dried so as to eliminate all or a portion of the solvent that is introduced during the impregnation, preferably at a temperature of between 50 and 250° C., in a more preferred manner between 70° C. and 200° C. The drying is carried out in air or under an inert atmosphere (nitrogen, for example).

After drying, the catalyst is in general calcined, in general in air. The calcination temperature is in general between 250° C. and 900° C., preferably between 350° C. and 750° C. The calcination period is in general between 0.5 hour and 16 hours, preferably between 1 hour and 5 hours.

The catalyst that is obtained at the end of the calcination stage in general undergoes a treatment under a gaseous stream that comprises between 25% by volume and 100% by volume of a reducing gas. The reducing gas is preferably hydrogen. In a preferred manner, this stage is carried out at a temperature of between 50° C. and 750° C., preferably between 200 and 500° C. The duration of the treatment is in general between 1 and 40 hours, preferably between 2 and 20 hours. The rise in temperature up to the desired reduction temperature is in general slow, for example fixed between 0.1 and 5° C./minute. This reducing treatment is carried out either in situ (in the same reactor as the one in which the selective hydrogenation reaction is performed) or ex situ before being loaded into the reactor. This treatment makes it possible to activate said catalyst and to form metal particles in the zero-valent state. The active metal phase is thus obtained.

The impregnation stage can be carried out by consecutively or simultaneously introducing the metals on the substrate.

In a first variant, the impregnation of the elements is consecutive.

The first stage consists in preparing a solution that contains an iron precursor, preferably an aqueous solution that contains an iron precursor.

A volume of solution adapted to the porosity of the substrate and in a concentration of iron precursor that is adapted to the desired final content of the active phase is thus impregnated on the substrate.

The impregnated catalyst is dried under the conditions that are described above. Optionally, a calcination stage can be carried out under the conditions described above.

A second impregnation stage consists in preparing a solution that contains a precursor of the metal that is selected from between zinc and/or copper, preferably an aqueous solution that contains a precursor of the metal that is selected from between zinc and/or copper.

Following this second impregnation stage, the catalyst is dried again, then calcined and reduced under the conditions described above.

The impregnation of the precursors of the active phase can be carried out in one or more successive impregnations. If it is done in multiple successive impregnations, then the drying stages will preferably be repeated after each impregnation, as well as optionally the intermediate calcination stages.

It is also possible to consider first impregnating the precursor of the metal that is selected from between zinc and/or copper, then next the iron precursor.

In a second variant, the different elements that constitute the catalyst are prepared in a single solution and are preferably impregnated under dry conditions on the substrate. Following this impregnation stage, the catalyst is dried, then calcined and reduced under the conditions described above.

The invention is illustrated by the following examples without thereby limiting the scope thereof.

EXAMPLES

Example 1

Catalyst A (Implementation Not in Accordance with the Invention)

The catalyst A (whose implementation is not in accordance with the invention) is an iron-based catalyst with a gamma-alumina substrate. It differs from the invention by the nature of the active phase; it contains only iron.

So as to prepare 100 g of catalyst with 5% by mass of Fe, an aqueous solution of iron nitrate $Fe(NO_3)_3$ is prepared by dilution of 36.17 g of nona-hydrated iron (III) nitrate (Aldrich™, purity>98%) in demineralized water. The total volume of the prepared aqueous solution corresponds to the pore volume of a commercial alumina substrate of 140 $m^2 \cdot g^{-1}$ and a total pore volume of 1 $mL \cdot g^{-1}$. The alumina substrate is in the form of balls with a diameter of between 2 and 4 mm. This solution is impregnated on 95 g of the alumina substrate.

The solid that is obtained is dried in air at 120° C., then is calcined for 2 hours at 450° C. under a stream of air with a flow rate of 1 $L \cdot h^{-1} \cdot (g \text{ of catalyst})^{-1}$.

The catalyst A that is obtained contains 4.89% by mass of metal Fe relative to the mass of dry catalyst (according to the elementary analysis).

Example 2

Catalyst B (Implementation Not in Accordance with the Invention)

The catalyst B (whose implementation is not in accordance with the invention) is a copper-based catalyst with a gamma-alumina substrate. It differs from the invention by the nature of the active phase; it contains only copper.

So as to prepare 100 g of catalyst with 5% by mass of Cu, an aqueous solution of copper nitrate $Cu(NO_3)_2$ is prepared by dilution of 19.01 g of tri-hydrated copper (II) nitrate (Aldrich™, purity>99%) in demineralized water. The total volume of the prepared aqueous solution corresponds to the pore volume of a commercial alumina substrate of 140 $m^2 \cdot g^{-1}$ and a total pore volume of 1 $mL \cdot g^{-1}$. The alumina substrate is in the form of balls with a diameter of between 2 and 4 mm. This solution is impregnated on 95 g of the alumina substrate.

The solid that is obtained is dried in air at 120° C., then is calcined for 2 hours at 450° C. under a stream of air with a flow rate of 1 $L \cdot h^{-1} \cdot (g \text{ of catalyst})^{-1}$.

The catalyst B that is obtained contains 4.91% by mass of metal Cu relative to the mass of dry catalyst (according to the elementary analysis).

Example 3

Catalyst C (Implementation Not in Accordance with the Invention)

The catalyst C (whose implementation is not in accordance with the invention) is an iron- and copper-based catalyst with a gamma-alumina substrate. It differs from the invention by a ratio of Fe:Cu of 2.33 (and therefore outside of the range of between 0.35 and 0.99).

So as to prepare 100 g of catalyst, an aqueous solution of iron nitrate $Fe(NO_3)_3$ is prepared by dilution of 24.5 g of nona-hydrated iron (III) nitrate (Aldrich™, purity>98%) in demineralized water. The total volume of the prepared aqueous solution corresponds to the pore volume of a commercial alumina substrate of 140 $m^2 \cdot g^{-1}$ and a total pore volume of 1 $mL \cdot g^{-1}$. The alumina substrate is in the form of balls with a diameter of between 2 and 4 mm. This solution is impregnated on 95 g of the alumina substrate.

The solid that is obtained is dried in air at 120° C.

This solid is then impregnated under dry conditions with an aqueous solution in which 6.3 g of tri-hydrated copper (II) nitrate (Aldrich™, purity>99%) has been dissolved in a quantity of demineralized water that corresponds to 95% of the pore volume of the alumina substrate.

The solid that is obtained is dried in air at 120° C., then is calcined for 2 hours at 450° C. under a stream of air with a flow rate of 1 $L \cdot h^{-1} \cdot (g \text{ of catalyst})^{-1}$.

The catalyst C that is obtained contains 3.25% by mass of metal Fe and 1.45% by mass of metal Cu relative to the mass of dry catalyst (according to the elementary analysis), or a total metal content of 4.70% by mass and a molar ratio of Fe:Cu that is equal to 2.33.

Example 4

Catalyst D (Implementation in Accordance with the Invention)

The catalyst D is an iron- and copper-based catalyst with a gamma-alumina substrate in accordance with the invention.

So as to prepare 100 g of catalyst, an aqueous solution of iron nitrate $Fe(NO_3)_3$ is prepared by dilution of 11.65 g of nona-hydrated iron (III) nitrate (Aldrich™, purity>98%) in demineralized water. The total volume of the prepared aqueous solution corresponds to the pore volume of a commercial alumina substrate of 140 $m^2 \cdot g^{-1}$ and a total pore volume of 1 $mL \cdot g^{-1}$. The alumina substrate is in the form of balls with a diameter of between 2 and 4 mm. This solution is impregnated on 95 g of the alumina substrate.

The solid that is obtained is dried in air at 120° C.

This solid is then impregnated under dry conditions with an aqueous solution in which 12.9 g of tri-hydrated copper (II) nitrate (Aldrich™, purity>99%) has been dissolved in a quantity of demineralized water that corresponds to 95% of the pore volume of the alumina substrate.

The solid that is obtained is dried in air at 120° C., then is calcined for 2 hours at 450° C. under a stream of air with a flow rate of 1 $L \cdot h^{-1} \cdot (g \text{ of catalyst})^{-1}$.

The catalyst D that is obtained contains 3.35% by mass of metal Cu and 1.50% by mass of metal Fe relative to the mass of dry catalyst (according to the elementary analysis), or a total metal content of 4.85% by mass and a molar ratio of Fe:Cu that is equal to 0.54.

Example 5

Catalyst E (Implementation in Accordance with the Invention)

The catalyst E is an iron- and zinc-based catalyst with a gamma-alumina substrate in accordance with the invention.

So as to prepare 100 g of catalyst, an aqueous solution of iron nitrate Fe(NO$_3$)$_3$ is prepared by dilution of 10.35 g of nona-hydrated iron (III) nitrate (Aldrich™, purity>98%) in demineralized water. The total volume of the prepared aqueous solution corresponds to the pore volume of a commercial alumina substrate of 140 m$^2 \cdot$g$^{-1}$ and a total pore volume of 1 mL$\cdot$g$^{-1}$. The alumina substrate is in the form of balls with a diameter of between 2 and 4 mm. This solution is impregnated on 95 g of the alumina substrate.

The solid that is obtained is dried in air at 120° C.

This solid is then impregnated under dry conditions with an aqueous solution in which 16.2 g of hexa-hydrated zinc (II) nitrate (Aldrich™, purity>98%) has been dissolved in a quantity of demineralized water that corresponds to 95% of the pore volume of the alumina substrate.

The solid that is obtained is dried in air at 120° C., then is calcined for 2 hours at 450° C. under a stream of air with a flow rate of 1 L$\cdot$h$^{-1} \cdot$(g of catalyst)$^{-1}$.

The catalyst E that is obtained contains 3.5% by mass of metal Zn and 1.55% by mass of metal Fe relative to the mass of dry catalyst (according to the elementary analysis), or a total metal content of 5.05% by mass and a molar ratio of Fe:Zn that is equal to 0.47.

Example 6

Isoprene Hydrogenation Catalytic Tests

Before the catalytic test, the catalysts A, B, C, D, and E are treated in a hydrogen stream with a V.V.H. of 500 h$^{-1}$ with a rise in temperature of 300° C./h and a plateau at a final temperature of 500° C. for 16 hours.

The catalysts are then subjected to a hydrogenation test in a perfectly-stirred "Grignard"-type batch reactor. To do this, 4 ml of reduced catalyst balls is fixed, protected from air, in an annular basket located around the agitation rotor. The baskets that are used in the reactors are of the Robinson-Mahoney type.

Hydrogenation is carried out in the liquid phase.

The composition of the feedstock is the following: 8% by weight of isoprene, 92% n-heptane (solvent).

The test is carried out under a constant pressure of 3.5 MPa of hydrogen and at a temperature of 45° C.

The catalytic activities are expressed in mols of H$_2$ consumed per minute and per gram of metal and are reported in Table 1.

TABLE 1

Activities Measured by Hydrogenation of Isoprene

| Catalyst | Ratio Fe:(Zn or Cu) | Catalytic Activity* |
|---|---|---|
| Catalyst A (Fe)—Not in Accordance | — | 0.09 |
| Catalyst B (Cu)—Not in Accordance | — | 0.50 |
| Catalyst C (Fe—Cu)—Not in Accordance | 2.33 | 9.41 |
| Catalyst D (Fe—Cu) | 0.54 | 33.52 |
| Catalyst E (Fe—Zn) | 0.47 | 27.03 |

*In (millimols of H$_2$)/[min × (gram of metal)]

The products of the reaction are analyzed by gas phase chromatography and make it possible to calculate selectivity by hydrogenation toward the formation of alkenes. Selectivity toward the formation of alkenes is defined starting from contents in the reaction medium of different products of the reaction, in the following way: selectivity=(methylbutenes)/(methylbutenes+2-methylbutane). Selectivity is higher the lower the formation of 2-methylbutane. Selectivity is evaluated for a 95% conversion of the isoprene (the conversion is defined as the ratio between the quantity of isoprene that has reacted and the initial quantity of isoprene). Selectivities are reported in Table 2.

TABLE 2

Selectivities toward the Formation of Alkene Measured by Hydrogenation of Isoprene

| Catalyst | Ratio Fe:(Zn or Cu) | Selectivity toward the Formation of Alkene* |
|---|---|---|
| Catalyst A (Fe)—Not in Accordance | — | n.d.** |
| Catalyst B (Cu)—Not in Accordance | — | 93 |
| Catalyst C (Fe—Cu)—Not in Accordance | 2.33 | 83 |
| Catalyst D (Fe—Cu) | 0.54 | 92 |
| Catalyst E (Fe—Zn) | 0.47 | 89 |

*In % at 95% conversion of isoprene
**Not determined because 95% conversion of isoprene is not reached during the period of the reaction The results that appear in Tables 1 and 2 demonstrate that the catalysts D and E, containing iron and a metal selected from between zinc or copper in a ratio of Fe:Zn or Cu of between 0.35 and 0.99, are more active and as selective as the catalysts that contain only Fe or Cu (catalysts A and B) or as a catalyst that contains iron and copper in a molar ratio of Fe:Cu of 2.33 (catalyst C).

The invention claimed is:

1. Method for selective hydrogenation of a hydrocarbon feedstock that contains at least 2 carbon atoms per molecule and that has a final boiling point that is less than or equal to 250° C. and that comprises at least one polyunsaturated compound, in which in the presence of hydrogen, said feedstock is brought into contact with at least one catalyst that comprises a substrate and an active metal phase that is deposited on said substrate; said active metal phase comprises iron and at least one metal that is selected from between zinc and copper in a molar ratio of Fe : (Zn and/or Cu) of between 0.35 and 0.99, wherein said hydrocarbon feedstock is selected from the group that consists of a fraction that is obtained from catalytic cracking, a C2 steam-cracking fraction, a C3 steam-cracking fraction, a C4 steam-cracking fraction, a C5 steam-cracking fraction, and a steam-cracking gasoline, and wherein said hydrocarbon feedstock is a steam-cracking gasoline and said method is implemented in the liquid phase at a total pressure of between 0.3 and 6.5 MPa, at a temperature of between 20 and 250° C., at a molar ratio of (hydrogen)/polyunsaturated compounds to be hydrogenated) of between 1 and 2, and at an hourly volumetric flow rate of between 0.5 h$^{-1}$ and 50 h$^{-1}$.

2. Method for selective hydrogenation according to claim 1, in which the molar ratio of Fe:(Zn and/or Cu) is between 0.4 and 0.8.

3. Method for selective hydrogenation according to claim 1, in which the content by mass of the active metal phase in relation to the total mass of the final substrate catalyst is between 0.05% and 40%.

4. Method for selective hydrogenation according to claim 3, in which the content by mass of the active metal phase in relation to the total mass of the final substrate catalyst is between 0.1% and 25%.

5. Method for selective hydrogenation according to claim 4, in which the content by mass of the active metal phase in relation to the total mass of the final substrate catalyst is between 0.15% and 15%.

6. Method for selective hydrogenation according to claim 1, in which said substrate comprises at least one refractory oxide that is selected from the group that consists of the oxides of magnesium, aluminum, silicon, zirconium, thorium, or titanium, by itself or in a mixture with one another.

7. Method for selective hydrogenation according to claim 6, in which said substrate is selected from among aluminas, silicas, and silica-aluminas.

8. Method for selective hydrogenation according to claim 1, in which said substrate is in the form of balls or extrudates.

9. Method for selective hydrogenation according to claim 1, in which the active metal phase comprises at least one additional metal that is selected from among the metals of group VIII other than iron, and the metals of group IB other than copper.

10. Method for selective hydrogenation according to claim 1, which is implemented in the gaseous phase or in the liquid phase.

11. Method for selective hydrogenation according to claim 1, which is implemented at a temperature which is between 0° C. and 500° C., a pressure of between 0.1 and 20 MPa, an hourly volumetric flow rate of between 0.1 and 200 $h^{-1}$ for a liquid feedstock, between 100 and 50,000 $h^{-1}$ for a gaseous feedstock, and at a molar ratio of (hydrogen)/(polyunsaturated compounds to be hydrogenated) of between 0.1 and 200.

* * * * *